United States Patent
Menci et al.

(10) Patent No.: US 6,409,087 B1
(45) Date of Patent: Jun. 25, 2002

(54) SCANNING AND DETECTION MEANS

(75) Inventors: Pier Giovanni Menci; Romano Menci, both of Anagni; Pier Luigi Caprioli, Rome; Mauro Di Tomassi, Frosinone, all of (IT)

(73) Assignee: Europa Trading, s.r.l. (IT)

( * ) Notice: Subject to any disclaimer, the term of this patent is extended or adjusted under 35 U.S.C. 154(b) by 0 days.

(21) Appl. No.: 09/293,641

(22) Filed: Apr. 15, 1999

(30) Foreign Application Priority Data

Apr. 15, 1998 (EP) ............................................ 98106782

(51) Int. Cl.[7] ................................................. G06K 7/10
(52) U.S. Cl. ........................................ 235/468; 359/443
(58) Field of Search ...................... 235/462.25, 462.35, 235/462.43, 468.494; 359/443; 348/383, 744, 750; 345/1–3, 74, 75

(56) References Cited

U.S. PATENT DOCUMENTS 6,004,446 A * 12/1999 Middendorf et al. ........ 204/618
6,128,131 A * 10/2000 Tang ........................... 359/443
6,195,196 B1 * 2/2001 Kimura et al. .............. 359/295

FOREIGN PATENT DOCUMENTS

JP       2000-000910       * 1/2000

* cited by examiner

Primary Examiner—Thien M. Le
(74) Attorney, Agent, or Firm—R W Becker & Associates; R W Becker

(57) ABSTRACT

A scanning and detection device has a radiation source emitting radiation onto an object to be scanned. The device also has a detection screen with fluorescent elements converting incident radiation of the radiation source into different fluorescent radiation. The fluorescent elements are inorganic elements, organic elements, or inorganic and organic elements.

10 Claims, 3 Drawing Sheets

SCANNING AND DETECTION MEANS

BACKGROUND OF THE INVENTION

The invention relates to a scanning and detection means, and particularly refers to a simultaneous multiple energy scan system.

The present invention falls in the category of X-Ray inspection equipments normally used in some fields like medical, research, security etc. The technical innovations applied to this system make the device applicable in any field, particularly when it is necessary to investigate simultaneously organic and inorganic materials and a very low radiation is required.

From U.S. Pat. No. 4,873,708 it is known to provide a digital radiographic imaging system with a homogenous screen. The light efficiency of this system is high but the energy efficiency has a peak and saturation occurs, especially if objects of different materials, such a organic and inorganic materials, shall be scanned.

Thus it is an object of the present invention to provide a scanning and detection means, which has an equalized energy efficiency in a wide band of incident radiations.

SUMMARY OF THE INVENTION

This object is settled by claim 1. Advantageous developments may be taken from the subclaims.

A rotating spot of low power wideband spectra of radiant energy (X Ray, UV or other radiation) is generated from one source, passes through an object which is to be investigated, and reaches a special screen composed of a mixture of fluorescent components capable of different fluorescent in response to different incident wavelength of radiant energies.

The light generated by this screen is selectively converted into electrical signals and digitized in order to obtain a computerized picture. The image carried out with this multiple frequency radiation and selective light conversion is more accurate than the standard images obtained with other radiation inspection systems and is capable to resolve both organic and inorganic materials in the same picture.

This feature makes it possible to investigate all materials in only one scan period (few seconds for complete human body) so there is no need to rescan the same subject at different energy levels and consequently the object or subject absorbs less radiations.

It has been proposed to provide a scanning and detection means such that it comprises one single energy radiation source and one screen capable to convert the incident energy in light. With this systems it is possible to investigate different materials in the same object, but in the same picture it is possible to resolve materials with only slightly different density, being dependent of the applied energy.

To investigate other materials with very different density it is necessary to change the incident energy and to rescan the object. In any case the types of materials in the same picture are limited by the generated energy and by the type of the used screen. An extension of this apparatus would be to provide two different screens. In this case it is possible to increase the kinds of different density materials visible in the same scan but it is necessary to elaborate and mix the two pictures generated by the two screens.

Because the radiation penetration capability increases when the frequency of the radiation increases, it is necessary to choose the frequency of the applied radiation function of the density of the subject to investigate. E.g. for an X-Ray system it is possible to work with a soft source (few KeV) or with a hard source (hundreds of KeV) and the penetration is very different. More organic or in organic materials are normally used to realize the screen to detect this X-Ray. These materials are normally grouped in phosphors (ZnS, ZnCdS, etc.), rare earth oxides ($Gd_2O_2S$:Tb, $La_2O_2S$:Eu, (Zn, Cd)S:Ag, CsI:Na, and ZnCdS), oxysalts, silicates ($Zn_2SiO_9$, Mn, $Y_2SiO_5$: Ce, etc.), etc., which have different energy efficiencies and light emission peaks at different wavelengths, e.g., 420 nm for $Lu_2SiO_5$:Ce; 440 nm for $GdAlO_3$:Ce; 480 nm for $CdWO_4$; 560 nm for the CsI;Tl, etc.

Considering the absorption characteristic curve, the emission wavelength and the energy efficiencies for each of this materials, it is possible to generate one mixture of this, capable of converting to light a wideband of incident radiation of interest for the particularly inspection without peak of saturation.

Because of the very large number of these materials there are infinite possible combinations and it is possible to generate a general purpose screen (e.g. working from 70 to 160 KeV) or to realize a particular screen capable to highlight one subband of incident energy with respect to another and so on. This allows to investigate practically all materials (organic and/or inorganic) because of the possibility to reduce the high different density in relatively low difference in light.

The proposed invention uses only one energy source capable to generate a low power wideband spectra of energy in order to penetrate simultaneously all different density materials and only one screen, composed of a mixture of different fluorescent materials, capable of converting the different incident spectra of energy into different levels of light (or colors). This allows to resolve in the same picture organic and inorganic materials with very high difference in density. The image reconstruction is proposed with a linear scan system, but it is also possible with an areal system.

BRIEF DESCRIPTION OF THE DRAWINGS

Further advantages, details and features may be taken from the following description of one embodiment of the invention.

DESCRIPTION OF PREFERRED EMBODIMENTS

Figure 1:
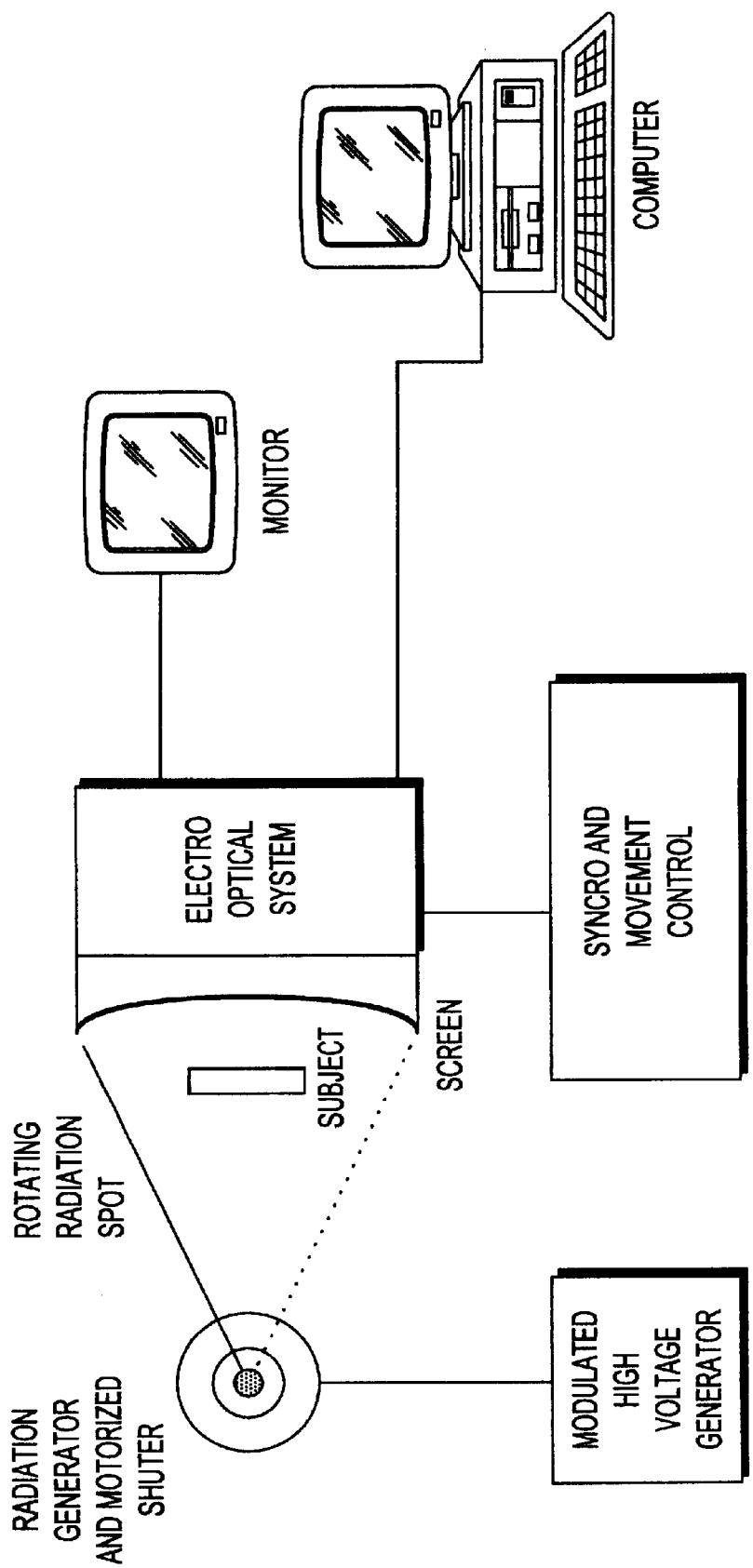
FIG. 1 shows a possible arrangement of the system, according to one embodiment.
Figure 3:
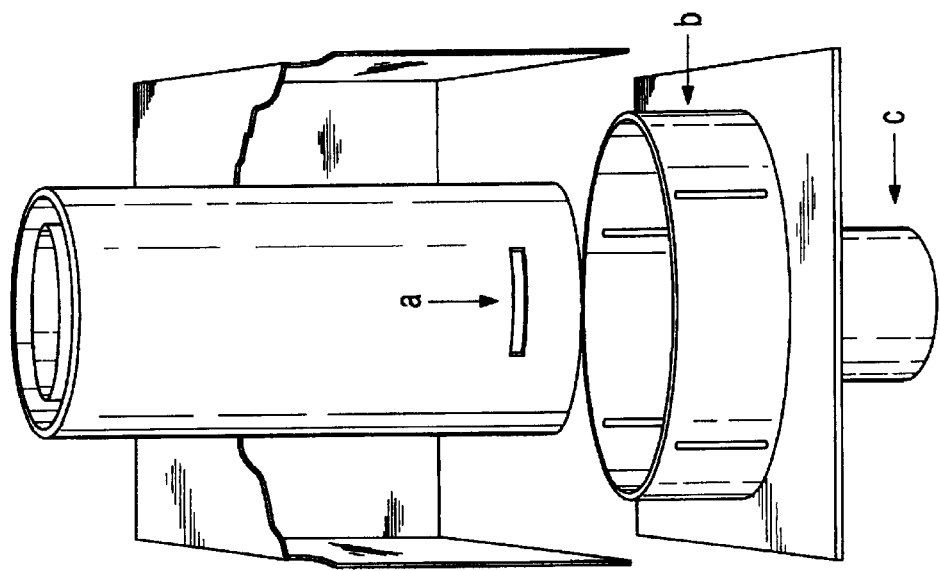
FIGS. 2 and 3 show details of the radiation source.
Figure 2:
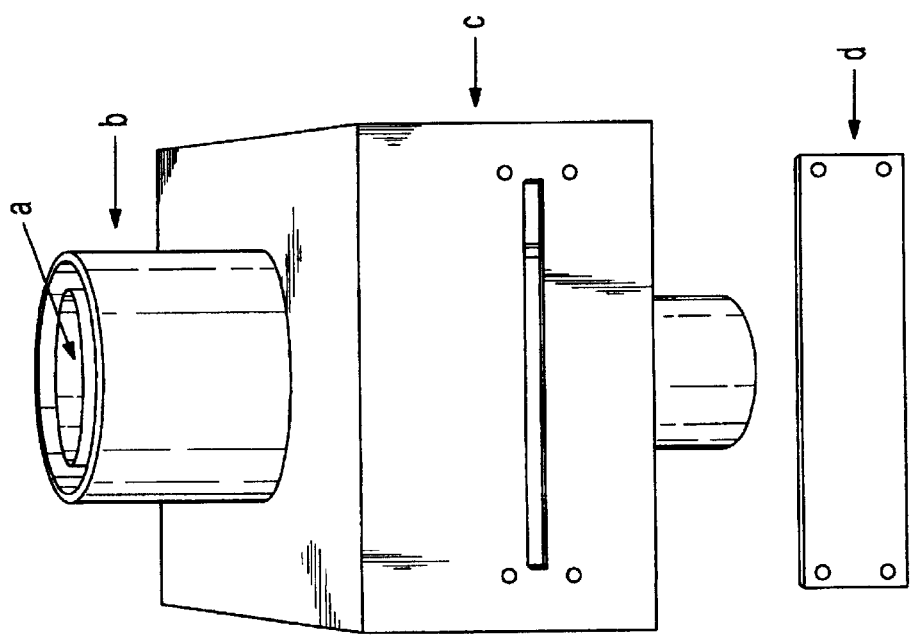

A radiant energy generator (FIG. 2, part a) is put inside a radiation proof housing (FIG. 2, part b). One small slot (FIG. 3, part a) is provided to output the radiation. A rotating motorized cylindrical shutter (FIG. 3, part b and c), coaxial with the generator and provided with one or more opening or holes (or slots perpendicular to the slot in the first radiation proof housing) allows to generate a small size spot of radiation.

Figure 4:
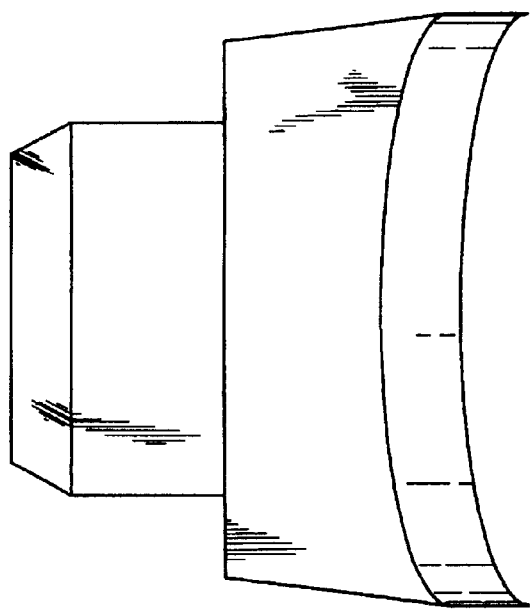

A second coaxial housing, like the first one (FIG. 2, part c) is added to create a three plane spatial filter in order to reduce the unused emitted radiations creating a collimated spot. A radiation filter (FIG. 2, part d) is applied to the output slot in order to equalize the spectra of energy for equalizing the emitted energy over the emission spectrum by eliminating K lines and emission peaks. Modulated high voltage applied to the generator allows it to generate a wideband frequency spectra of energy, wherein a radiation source is supplied with the modulated high voltage of a repetitive ramp starting approximately at K line and ending at a maximum energy level to be generated. This small collimated rotating spot of broadband radiant energy is generated in line with the detector (FIG. 4) and penetrates different density materials simultaneously.

Figure 5:
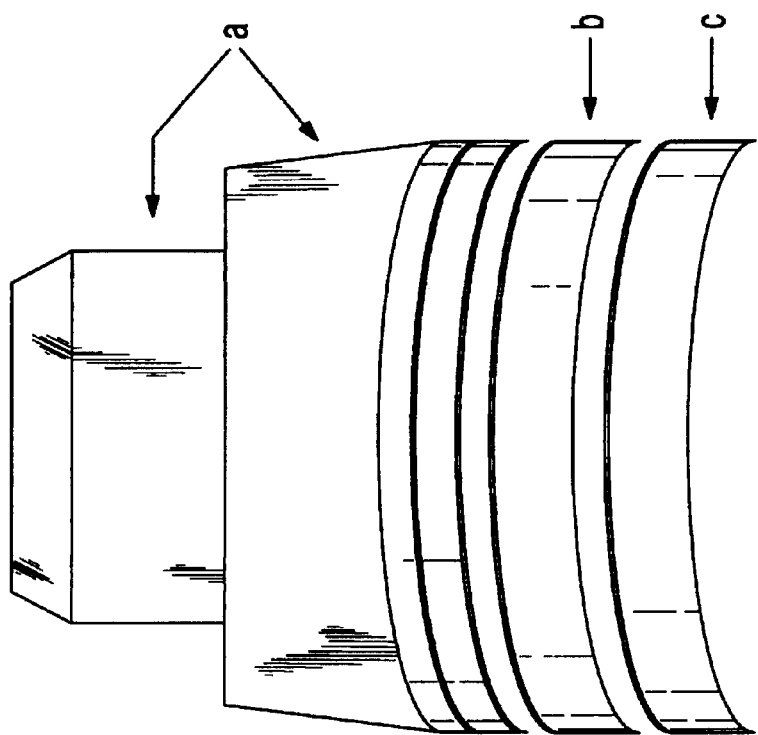
FIGS. 4 and 5 show details of a detector.

A special screen (FIG. 5, part b), capable of converting selectively the incident radiation in light, makes it possible to reconstruct one line of an image in which all organic or inorganic materials are visible. The detection screen has a concave shape for accommodating divergence of the radiation. This screen is fixed in contact with an electro-optical system (FIG. 5, part a) by an opaque holder (FIG. 5, part c). This electro-optical system converts the light into an electrical signal and a digitized line of an image is generated. The relative movement of this line with respect to the subject in examination allows reconstructing a complete two- or three-dimensional image.

The screen is composed of a mixture of fluorescent components, eventually organic and/or inorganic materials, capable of converting the different incident wavelength of radiation into levels of light, or colors. Because of the low power wideband frequency the radiation source emits radiation of multiple frequency spectra of energy, and it is possible to avoid saturation in resolving a very high different density materials. The digitized image carried out is displayed and stored in a computer for processing and analysis.

The present invention is, of course, in no way restricted to the specific disclosure of the specification and drawings, but also encompasses any modifications within the scope of the appended claims.

What is claimed is:

1. A scanning and detection device comprising:
   a radiation source emitting radiation onto an object to be scanned;
   a detection screen comprising fluorescent elements converting incident radiation of said radiation source into different fluorescent radiation, wherein said fluorescent elements are selected from the group of inorganic elements and organic elements.

2. A scanning and detection device according to claim 1, wherein said radiation source emits radiation of multiple frequencies.

3. A scanning and detection device according to claim 1, wherein the object to be scanned is comprised of materials having different densities, wherein said materials are selected from the group of organic materials and inorganic materials.

4. A scanning and detection device according to claim 1, wherein said fluorescent elements are comprised of a mixture of $Lu_2SiO_5$:Ce, $CdWO_4$, CsI:Tl, $Gd_2O_2S$:Tb, $La_2O_2S$:Eu and (Zn, Cd)S:Ag.

5. A scanning and detection device according to claim 1, wherein said fluorescent elements are comprised of a mixture of $Zn_2SiO_9$, rare earth oxides, CsI:Na, $Gd_2O_2S$:Pr, $La_2O_2S$:Eu and ZnCdS.

6. A scanning and detection device according to claim 1, wherein said radiation source has a rotary shutter having at least one opening generating a rotating spot emitting a large spectrum of radiation.

7. A scanning and detection device according to claim 6, wherein said radiation source comprises at least one three level spatial filter to collimate radiation.

8. A scanning and detection device according to claim 1, wherein said radiation source further comprises an equalization filter for equalizing the emitted energy over the emission spectrum of said radiation by eliminating K lines and emission peaks.

9. A scanning an detection device according to claim 1, wherein said radiation source is supplied with a modulated high voltage of a repetitive ramp starting approximately at K line energy and ending at a maximum energy level to be generated.

10. A scanning and detection device according to claim 1, wherein said detection screen has a concave shape for accommodating divergence of said radiation after penetration of the object to be scanned and for providing equal spacing between said radiation source and said detection screen.

* * * * *